United States Patent
Aboul-Magd et al.

(10) Patent No.: US 9,769,697 B2
(45) Date of Patent: Sep. 19, 2017

(54) SYSTEM AND METHOD FOR CARRIER AGGREGATION FOR WIRELESS LOCAL AREA NETWORKS

(71) Applicant: Huawei Technologies Co., Ltd., Shenzhen (CN)

(72) Inventors: Osama Aboul-Magd, Kanata (CA); Kwok Shum Au, Shenzhen (CN); Jung Hoon Suh, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/066,532

(22) Filed: Mar. 10, 2016

(65) Prior Publication Data

US 2016/0192231 A1    Jun. 30, 2016

Related U.S. Application Data

(63) Continuation of application No. 14/061,464, filed on Oct. 23, 2013, now Pat. No. 9,319,202.

(Continued)

(51) Int. Cl.
*H04W 28/02* (2009.01)
*H04H 20/38* (2008.01)
(Continued)

(52) U.S. Cl.
CPC ........ *H04W 28/0263* (2013.01); *H04H 20/38* (2013.01); *H04L 5/001* (2013.01);
(Continued)

(58) Field of Classification Search
CPC ..... H04L 5/0058; H04L 5/001; H04L 5/0041; H04L 5/0098; H04L 29/08018;
(Continued)

(56) References Cited

U.S. PATENT DOCUMENTS 8,811,203 B1   8/2014 Liu et al.
2005/0070279 A1   3/2005 Ginzburg et al.
(Continued)

FOREIGN PATENT DOCUMENTS

CN   102598769 A   7/2012
WO   2012064502 A1   5/2012

OTHER PUBLICATIONS

Pietro Nicoletti, "IEEE 802.11 frame format" Jun. 2005 http://www.studioreti.it/slide/802-11-Frame_E_C.pdf.*
(Continued)

*Primary Examiner* — Mark Rinehart
*Assistant Examiner* — Kenneth P Hunt
(74) *Attorney, Agent, or Firm* — Slater Matsil, LLP

(57) ABSTRACT

Embodiments are provided herein for improving carrier aggregation for wireless networks. A plurality of bandwidth channels are assigned to a basic service set (BSS) for transmissions. Specifically, the bandwidth channels are divided into multiple channel segments corresponding to multiple primary or alternate primary channels. A channel segment possibly further includes one or more additional secondary channels. The locations of the primary or alternate primary channels that correspond to the channel segments of the BSS are then broadcasted in the network. When a station or AP receives this BSS information, it searches for an available primary or alternate primary channel of the BSS to begin transmission. Upon detecting an available primary channel or alternate primary channel that is not used for another transmission, the station or AP transmits data on the channel segment corresponding to the detected primary or alternate primary channel.

21 Claims, 5 Drawing Sheets

Related U.S. Application Data

(60) Provisional application No. 61/717,919, filed on Oct. 24, 2012.

(51) Int. Cl.

| | | |
|---|---|---|
| *H04L 29/06* | (2006.01) | |
| *H04L 29/08* | (2006.01) | |
| *H04L 5/00* | (2006.01) | |
| *H04W 84/12* | (2009.01) | |
| *H04W 88/02* | (2009.01) | |
| *H04W 88/08* | (2009.01) | |

(52) U.S. Cl.
CPC .......... *H04L 5/0041* (2013.01); *H04L 5/0058* (2013.01); *H04L 5/0098* (2013.01); *H04L 29/08018* (2013.01); *H04L 69/22* (2013.01); H04L 5/0023 (2013.01); H04L 5/0089 (2013.01); *H04W 84/12* (2013.01); *H04W 88/02* (2013.01); *H04W 88/08* (2013.01)

(58) Field of Classification Search
CPC ..... H04L 69/22; H04L 5/0023; H04L 5/0089; H04H 20/38; H04W 88/08; H04W 84/12; H04W 88/02; H04W 28/0263
USPC ......................................................... 370/329
See application file for complete search history.

(56) References Cited

U.S. PATENT DOCUMENTS

| | | |
|---|---|---|
| 2008/0192644 A1 | 8/2008 | Utsunomiya et al. |
| 2011/0110349 A1 | 5/2011 | Grandhi |
| 2012/0052900 A1 | 3/2012 | Liu et al. |
| 2012/0113952 A1 | 5/2012 | Kneckt et al. |
| 2013/0176980 A1* | 7/2013 | Kneckt ................ H04W 28/26 370/329 |
| 2013/0265907 A1 | 10/2013 | Kim et al. |
| 2014/0112273 A1 | 4/2014 | Aboul-Magd et al. |
| 2014/0301328 A1* | 10/2014 | Yacovitch ............. H04W 16/02 370/329 |
| 2015/0003378 A1 | 1/2015 | Jones, IV et al. |
| 2016/0150536 A1* | 5/2016 | Valliappan ........ H04W 74/0816 370/329 |

OTHER PUBLICATIONS

"3rd Generation Partnership Project; Technical Specification Group Services and System Aspects; Direct Tunnel Deployment Guideline (Release 7)," 3GPP TR 23.919 v7.0.0, Jun. 2007, 12 pages.

Perahia et al., "Gigabit Wireless LANs: An Overview of IEEE 802.11ac and 802.11ad," ACM Sigmobile Mobile Computing and Communications Review, vol. 15, No. 3, Nov. 29, 2011, pp. 23-33, XP055015658.

"Draft Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE P802.11ac/D3.0, Jun. 2012, 385 pages.

"IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Std 802.11-2012 (Revision of IEEE Std 802.11-2007), Mar. 29, 2012, 2793 pages.

"Supplement to IEEE Standard for Information technology—Telecommunications and information exchange between systems—Local and metropolitan area networks—Specific requirements; Part 11: Wireless LAN Medium Access Control (MAC) and Physical Layer (PHU) Specifications; High-speed Physical Layer in the 5 GHZ Band," IEEE Std 302.11a-1999 (Supplement to IEEE Std 802.11-1999) 91 pages.

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput" IEEE Std 802.11n-2009, Oct. 29, 2009, 536 pages.

* cited by examiner

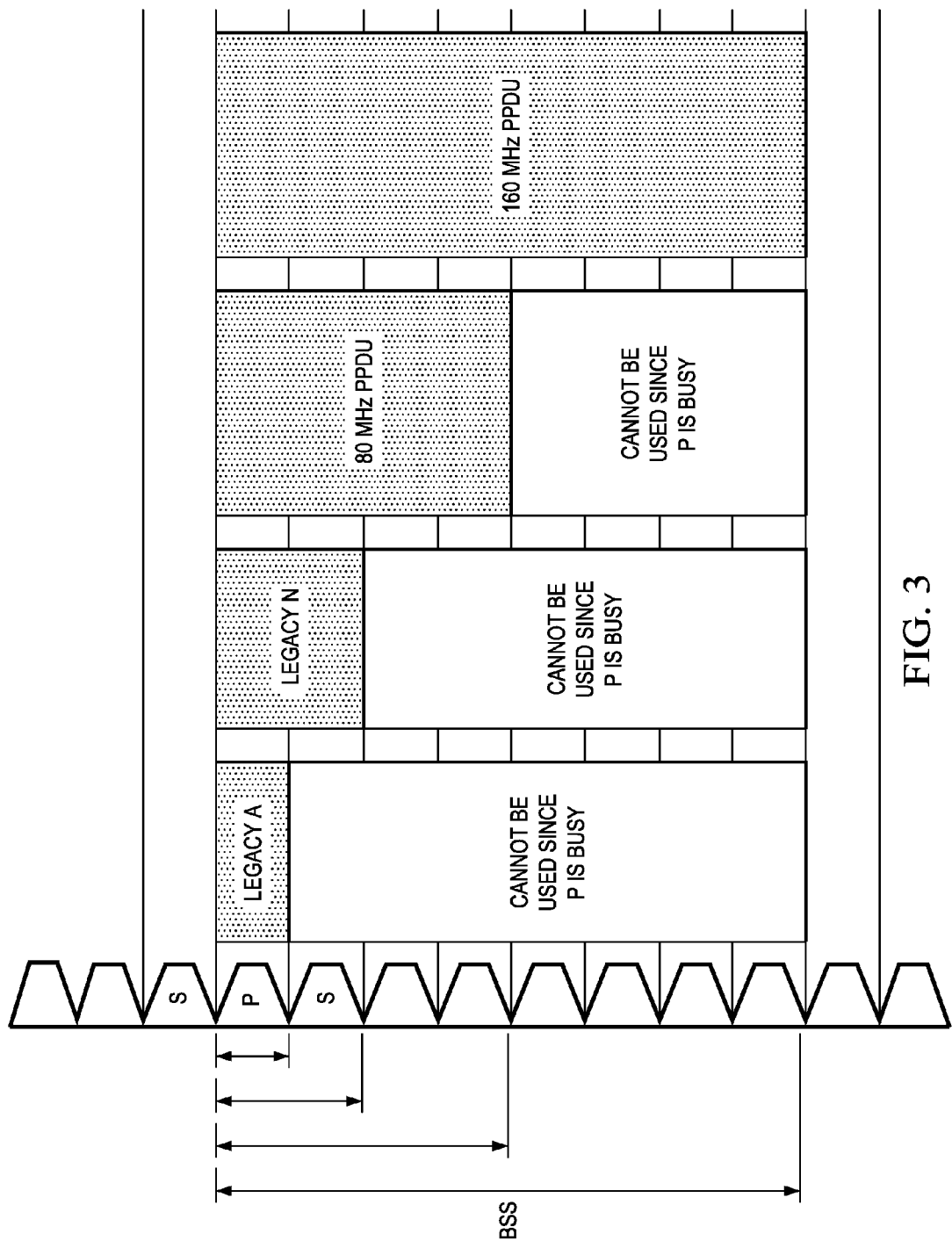

SYSTEM AND METHOD FOR CARRIER AGGREGATION FOR WIRELESS LOCAL AREA NETWORKS

This application is a continuation of U.S. Non-Provisional patent application Ser. No. 14/061,464 filed on Oct. 23, 2013 and entitled "System and Method for Carrier Aggregation for Wireless Local Area Networks," which claims the benefit of U.S. Provisional Application No. 61/717,919 filed on Oct. 24, 2012 and entitled "System and Method for WLAN Generalized Carrier Aggregation," both of which are hereby incorporated herein by reference as if reproduced in their entireties.

TECHNICAL FIELD

The present invention relates to the field of wireless network communications, and, in particular embodiments, to a system and method for carrier aggregation for wireless local area networks.

BACKGROUND

Achieving higher data rates generally is a goal of any network design. According to communication theory, the achieved data rate (e.g., measured in megabits per second (bps)) of any physical (PHY) layer design is proportional to the channel bandwidth (e.g., measured in megahertz (Hz)). Wider channels generally can sustain higher data rates compared to narrow channels. In many networking scenarios, only channels of narrow bandwidth are available, for instance either due to regulation or spectrum availability. In these cases a wider channel can be constructed by grouping together or aggregating a number of narrow channels to form a wider channel. The technique by which this grouping is achieved is referred to as carrier aggregation. However, current carrier aggregation technique for wireless local area networks (WLANs) can waste bandwidth resource when assigning larger aggregated bandwidth to legacy systems that are not capable of using the entire aggregated bandwidth range. There is a need for an improved carrier aggregation scheme that handles such situations.

SUMMARY OF THE INVENTION

In accordance with an embodiment, a method implemented by a network component for carrier aggregation for wireless networks includes assigning, to a basic service set (BSS) comprising a plurality of stations and an access point of the wireless network, a plurality of bandwidth channels for transmissions. The method further includes dividing the bandwidth channels into multiple channel segments corresponding to multiple prime channels in the bandwidth channels. The locations of the prime channels for the channel segments of the BSS are then broadcasted in the network.

In accordance with another embodiment, a method implemented by a communication device for supporting carrier aggregation in a wireless network includes receiving BSS information indicating a plurality of prime channels for a BSS. The prime channels correspond to a plurality of channel segments of the BSS. The method further includes, upon determining to start a transmission, searching for an available and unused prime channel of the BSS. Upon detecting an available and unused prime channel of the BSS, a frame is transmitted on the channel segment corresponding to the detected prime channel.

In accordance with another embodiment, a network component for carrier aggregation for wireless networks includes at least one processor and a non-transitory computer readable storage medium storing programming for execution by the at least one processor. The programming including instructions to assign, to a BSS comprising a plurality of stations and an access point of the wireless network, a plurality of bandwidth channels for transmissions. The bandwidth channels are divided into multiple channel segments corresponding to multiple prime channels in the bandwidth channels. The programming further includes instructions to broadcasting, in the network, locations of the prime channels for the channel segments of the BSS.

In accordance with yet another embodiment, a communication device supporting carrier aggregation in a wireless network includes at least one processor and a non-transitory computer readable storage medium storing programming for execution by the at least one processor. The programming includes instructions to receive BSS information indicating a plurality of prime channels of a BSS. The prime channels correspond to a plurality of channel segments of the BSS. The programming includes further instructions to, upon determining to start a transmission, search for an available and unused prime channel of the BSS, and upon detecting an available and unused prime channel of the BSS, transmit a frame on the channel segment correspond to the detected prime channel.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 illustrates an impact of legacy stations on basic service set (BSS) throughput using current carrier aggregation in WLAN;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
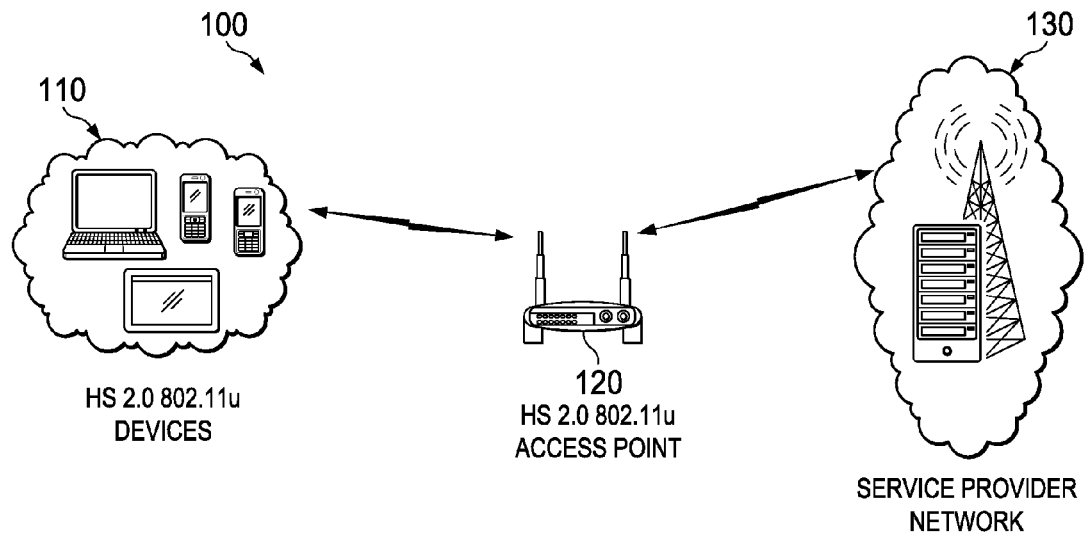
FIG. 1 illustrates a wireless local area network (WLAN)

FIG. 1 shows a wireless local area network (WLAN) 100 comprising one more stations (STAs) 110 and an access point (AP) 120 connected to a service provider network 130. The STA 110 may be any of various devices, such as a cell phone, laptop, tablet, smart sensor, handheld or consumer electronic device, and other user devices that have a Wi-Fi (or IEEE 802.11) interface that can interact with a Wi-Fi network. These devices also may be able to interact with other types of communication networks, such as a cellular network. The AP 120 provides the connected STAs 110 access to the service provider network 130 to provide various services (e.g., IP data services) to the STAs 110. The AP 120 and one or more STAs can form a basic service set (BSS), which is the basic building block of an IEEE 802.11 WLAN. The AP 120 signals the BSS to the STAs 110, which compete to use the BSS for transmission (e.g., each STA 110 at a time). A BSS generally can be identified by a service set identifier (SSID), which may be configured and broadcasted by the AP 120 to the STAs 110.

Figure 2:
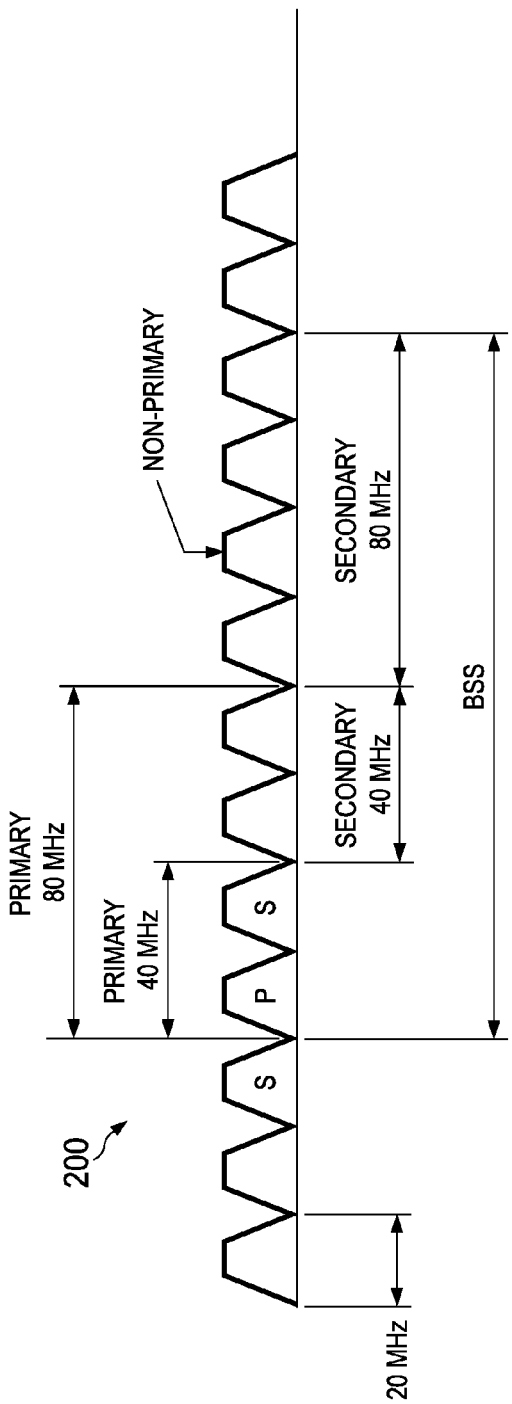
FIG. 2 illustrates a current carrier aggregation in WLAN.

Carrier aggregation is supported both in WLAN and cellular (LTE-A) standards. FIG. 2 shows a current carrier aggregation scheme 200 in a common WLAN scenario where the available spectrum (unlicensed) is divided into 20 mega Hz (MHz) channels. The concepts of primary (P) and secondary (S) (also known as non-primary) channels are introduced in IEEE 802.11n to extend the channel bandwidth to 40 MHz. Each 40 MHz channel consists of a primary 20 MHz and a secondary 20 MHz channels. Primary channels are implemented to ensure backward compatibility with legacy devices, where the AP sends management and control frames over the primary channel using legacy frame format. Concepts introduced in IEEE 802.11n were extended in IEEE 802.11ac to support wider channels up to 160 MHz. FIG. 2 shows a scenario where the wider channel is constructed using contiguous 20 MHz channels. The use of non-contiguous channels also is supported in IEEE 802.11ac.

FIG. 3 shows the impact of legacy stations on BSS throughput. Legacy-a and Legacy-n refer to a Legacy IEEE 802.11a station and a Legacy IEEE 802.11n station, respectively. In the WLAN, the P and at least one S are defined for the entire basic service set (BSS). The use of P and S channels in WLAN limits the use of the available spectrum. The position of the P channel and the position of the S channel relative to the P channel determine the operating channels of the AP and BSS. According to this WLAN carrier aggregation paradigm, when the P channel is seized and used for transmission (e.g., by a STA), other channels in the same BSS that remain available are not allowed for use by other transmissions since the P channel, and therefore the entire BSS, is already accessed or used. Since the available channels cannot be used for other transmissions, bandwidth resource and hence throughput is wasted. For instance, when Legacy-a gains access to the medium, it transmits its frames using the primary channel. The rest of the 20 MHz channels within the BSS may be available but cannot be used because the primary channel is utilized for transmission by Legacy-a. Similarly, Legacy-n may use only 40 MHz from the entire BSS, resulting in unused 20 MHz channels in the BSS. Since the unused 20 MHz channels cannot be used for other transmissions, bandwidth resource is wasted.

Embodiments are provided herein for improving carrier aggregation for WLANs and other networks that use similar carrier aggregation with primary and secondary channels. For example, the embodiments may be implemented in Wi-Fi networks and devices, such as Wi-Fi access points, Wi-Fi stations, and the like. The embodiments use multiple primary channels or an alternate primary channel within the same BSS to allow different transmissions the access to the BSS, as described below. The embodiments also include inter-band carrier aggregation. Since more transmissions can use the channels within the BSS, available (unlicensed) spectrum bandwidth resource can be conserved or used, which improves overall throughput of the network and allows more transmissions (e.g., by STAs) over limited resource.

Figure 4:
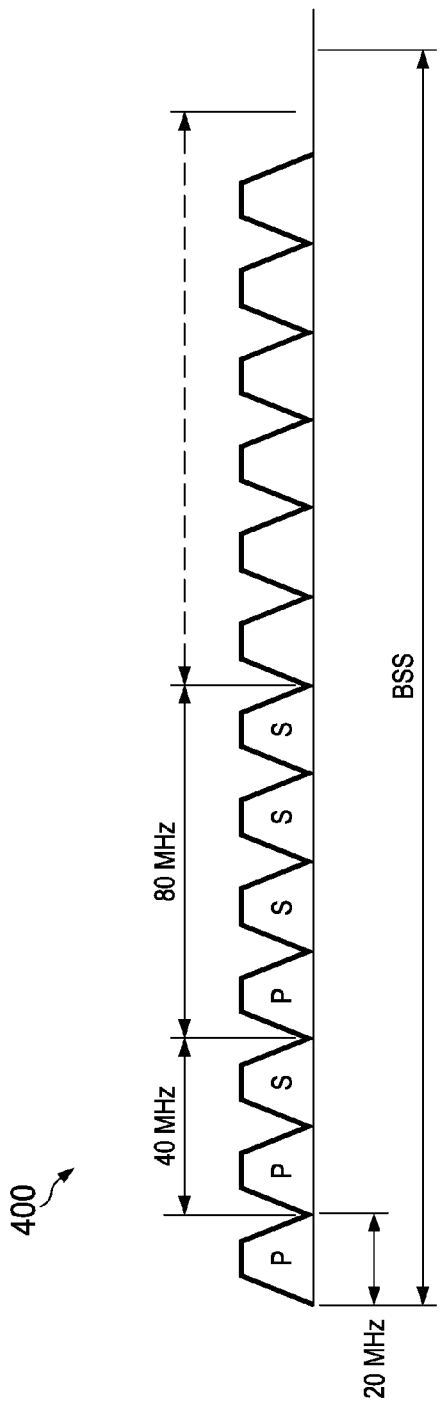
FIG. 4 illustrates an embodiment of an improved carrier aggregation scheme for a WLAN.

FIG. 4 shows an embodiment of an improved carrier aggregation scheme 400. To allow efficient utilization of the available spectrum, multiple primary channels can be used within a BSS. With multiple primary channels, different transmissions can cover all or a significant portion of the available spectrum. The network or AP may slice the spectrum into different bandwidth aggregated channels using corresponding primary channels. For instance, three primary 20 MHz channels are used in this scenario. The first primary channel defines a 20 MHz channel (a secondary is not needed), and the second and the third primary channels define 40 MHz and 80 MHz channels, respectively. The AP can direct associated stations to compete on the appropriate primary channel, given station bandwidth requirements. For example, legacy stations can use the available 20 MHz channel, while other stations that support more bandwidth can use the 40 MHz and 80 MHz channels. Each of the stations seizes a corresponding portion of the BSS by allocating and using the corresponding P channel. Multiple primary channels also can be used to identify dedicated downlink (DL) and uplink (UL) channels of the same or different bandwidth. For example, within the BSS, the first and second primary channels (of 20 and 40 MHz respectively) can be allocated for UL transmissions, while the third primary channel can be used for DL transmission. The secondary channels are also used for UL and DL transmissions as their corresponding P channels. The scheme 400 effectively segments the BSS into separate bandwidth segments to serve more than one transmission. In an embodiment, each segment bandwidth defined by a corresponding P channel in the BSS can be assigned a corresponding BSS ID.

Figure 5:
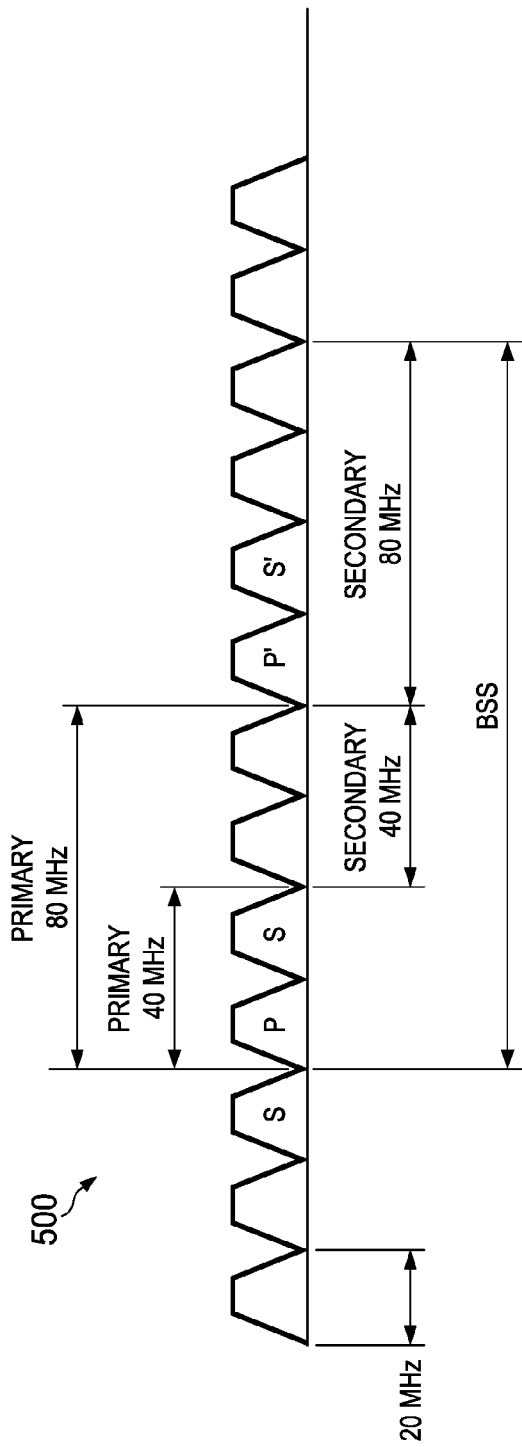
FIG. 5 illustrates another embodiment of a carrier aggregation scheme for a WLAN.

FIG. 5 shows an embodiment of another carrier aggregation scheme 500. To allow efficient utilization of the available spectrum, at least one alternate primary (P') channel can be used within the BSS in addition to the P channel. For example, a 160 MHz BSS is established where at least one alternate primary (P') channel is defined to divide the BSS bandwidth into at least two channels. In the scenario of FIG. 5, the first 80 MHz channel portion is defined by the P channel, and the second 80 MHz portion is defined by a P' channel. However, more P' channels can be included to define more than two portions. When the primary channel is busy, e.g., serving a legacy station, the remaining BSS portions (as defined by the P' channels) can be used to serve other stations. The bandwidth defined by the P' channels can be used by other stations if they are available and not used by the station using the P channel. Frames transmitted using the P channel or P' channels can be indicated by a field in the PHY or a Media Access Control (MAC) header of the transmitted frames.

Figure 6:
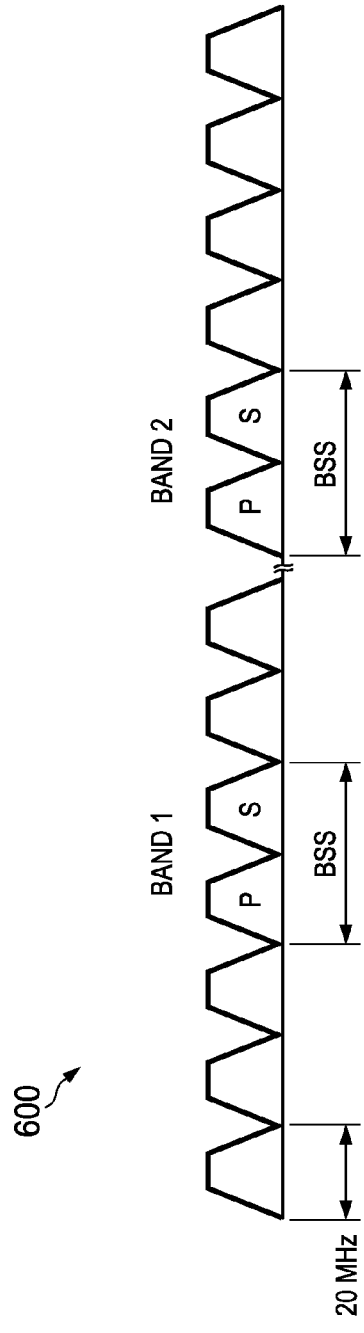
FIG. 6 illustrates another embodiment of a carrier aggregation scheme for a WLAN.

FIG. 6 illustrates an embodiment of another carrier aggregation scheme 600. In this scheme, carrier aggregation is extended to include inter-band carrier aggregation. Specifically, the BSS is extended between multiple bands (or non-contiguous portions of spectrum bandwidth). For example, the BSS is extended between two bands in the scenario of FIG. 6. Each band has its own primary and secondary channels, which can be used for backward compatibility and/or coexistence. The different bands can also be defined using primary and alternate primary channels, e.g., similar to the scheme 500. Additionally, each band of the BSS, can be further segmented into multiple portions that can be used by different transmissions. The individual bands of the BSS can be further segmented using multiple P channels as in the scheme 400, or using P and P' channels as in the scheme 500.

Figure 7:
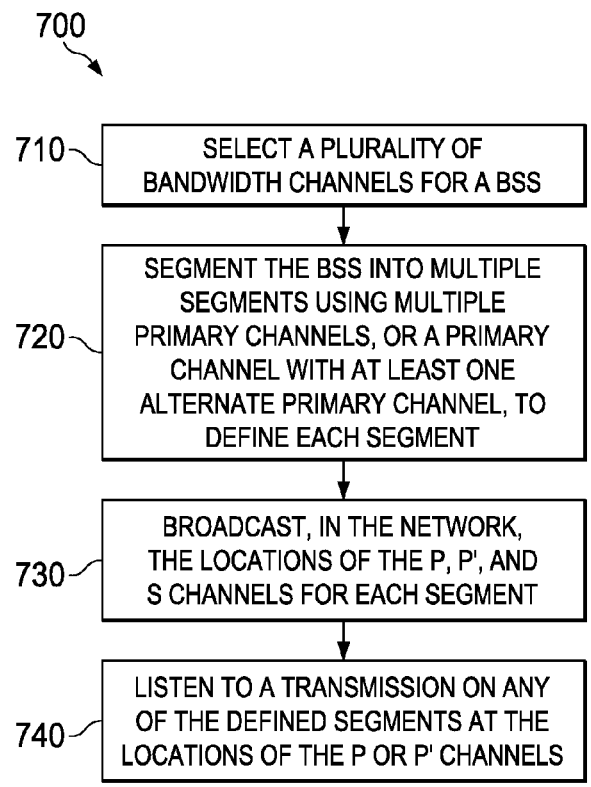
FIG. 7 illustrates an embodiment method for carrier aggregation for wireless networks.

FIG. 7 shows an embodiment method 700 for carrier aggregation for wireless networks, which may correspond to any of the embodiment schemes 400, 500, and 600 above. The method 700 may be implemented by a network component, such as the AP or a network controller. At step 710, a plurality of bandwidth channels are selected for a BSS. The channels may be of the same bandwidth, for example of 20 MHz, or different bandwidth. Further, the channels may be contiguous or non-contiguous (e.g., separate bands of the spectrum). At step 720, the BSS is segmented into multiple segments using multiple primary channels, or a primary channel with at least one alternate primary channel, to define each segment. In additional to a P or P' channel, one or more S channels may be included in any segment. The P or P' channels may also be located in non-contiguous bands that form the BSS. At step 730, the locations of the P, P', and S channels for each segment are broadcasted in the network, e.g., to any listening STAs and/or APs. At step 740, the method 700 listens to a transmission on any of the defined segments at the locations of the P or P' channels.

Figure 8:
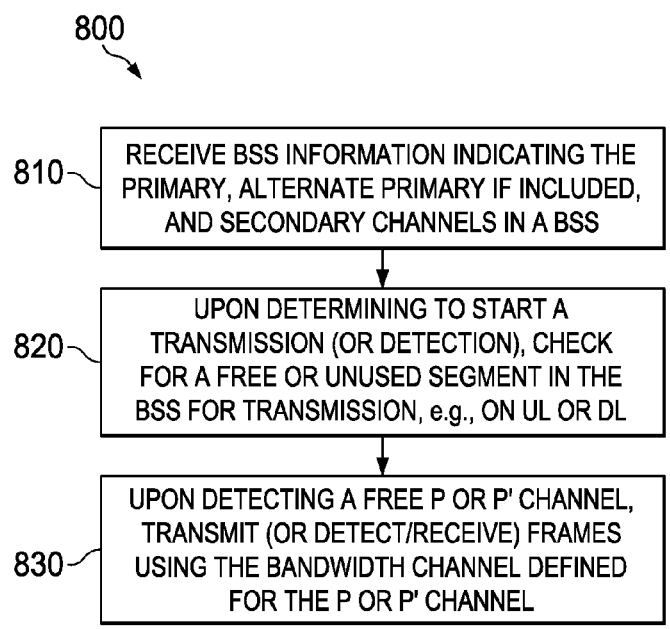
FIG. 8 illustrates another embodiment method for carrier aggregation for wireless networks.

FIG. 8 shows an embodiment method 800 for carrier aggregation for wireless networks, which may correspond to any of the embodiment schemes 400, 500, and 600 above. The method 800 may be implemented by a STA or an AP to determine channel bandwidth for transmission. At step 810, BSS information is received, indicating the primary, alternate primary if included, and secondary channels in a BSS. At step 820, upon determining to start a transmission (or detection), the STA or AP checks for a free or unused segment in the BSS for transmission, e.g., on UL or DL. For instance, the STA or AP checks for a free P channel. Alternatively, if a P channel is used, the STA or AP checks for a free P' channel. At step 830, upon detecting a free P or P' channel, frames are transmitted (or detected/received) using the bandwidth channel defined for the P or P' channel. The channel may be an aggregation of multiple channels including secondary channels. The channel may also be located in one or more non-contiguous bands for the BSS. In a scenario, the STA or AP may check for a free channel (e.g., free P or P' channel) that is dedicated for UL or DL transmission.

Figure 9:
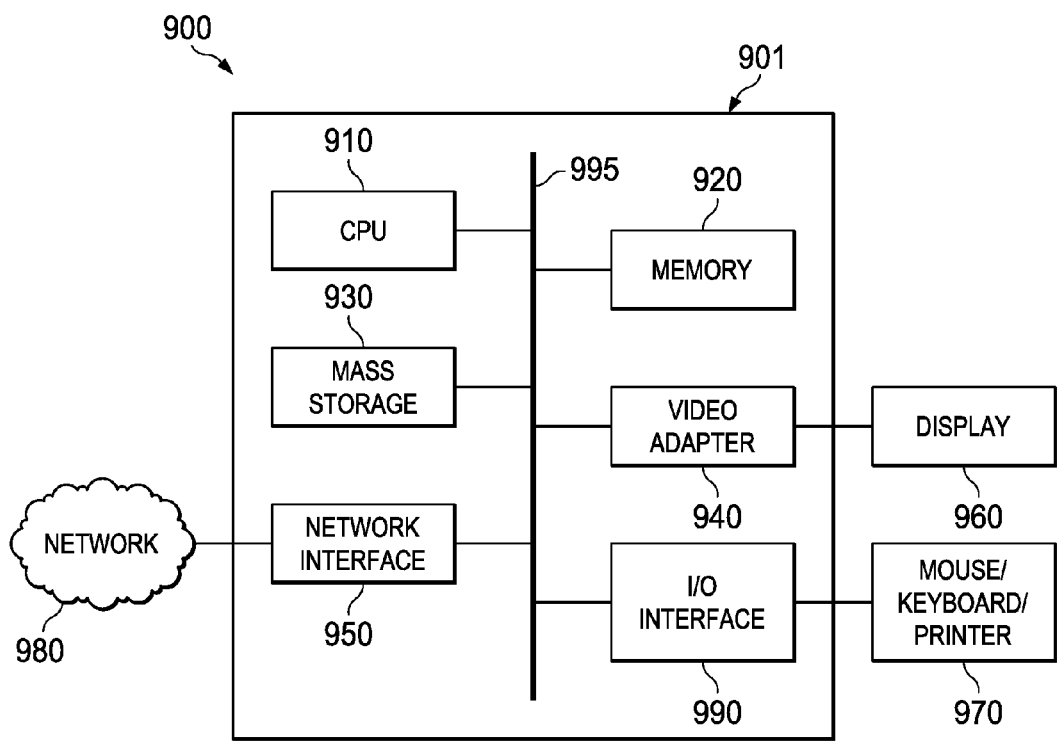
FIG. 9 is a diagram of a processing system that can be used to implement various embodiments.

FIG. 9 is a block diagram of an exemplary processing system 900 that can be used to implement various embodiments. Specific devices may utilize all of the components shown, or only a subset of the components and levels of integration may vary from device to device. For example, the devices include the APs and the STAs of a WLAN or a Wi-Fi system. Furthermore, a device may contain multiple instances of a component, such as multiple processing units, processors, memories, transmitters, receivers, etc. The processing system 900 may comprise a processing unit 901 equipped with one or more input devices, such as a microphone, mouse, touchscreen, keypad, keyboard, and the like. Also, processing system 900 may be equipped with one or more output devices, such as a speaker, a printer, a display, and the like. The processing unit may include central processing unit (CPU) 910, memory 920, mass storage device 930, video adapter 940, and I/O interface 990 connected to a bus 995.

The bus 995 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs. The mass storage device 930 may comprise any type of storage device configured to store data, programs, and other information and to make the data, programs, and other information accessible via the bus 995. The mass storage device 930 may comprise, for example, one or more of a solid state drive, hard disk drive, a magnetic disk drive, an optical disk drive, or the like.

The video adaptor 940 and I/O interface 990 provide interfaces to couple external input and output devices to the processing unit. As illustrated, examples of input and output devices include the display 960 coupled to the video adapter 940 and the mouse/keyboard/printer 970 coupled to the I/O interface 990. Other devices may be coupled to the processing unit 901, and additional or fewer interface cards may be utilized. For example, a serial interface card (not shown) may be used to provide a serial interface for a printer.

The processing unit 901 also includes one or more network interfaces 950, which may comprise wired links, such as an Ethernet cable or the like, and/or wireless links to access nodes or different networks. The network interface 950 allows the processing unit 901 to communicate with remote units via one or more networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   transmitting, by a wireless device, a Physical Layer Convergence Protocol (PLCP) Protocol Data Unit (PPDU), wherein a channel indicator in a media access control (MAC) header of the PPDU indicates whether the PPDU is transmitted over a primary channel.

2. The method of claim 1, wherein the channel indicator in the MAC header of the PPDU indicates that the PPDU is transmitted over a primary channel.

3. The method of claim 1, wherein the channel indicator in the MAC header of the PPDU directly indicates that the PPDU is transmitted over an alternate primary channel.

4. The method of claim 1, wherein the wireless device is an access point (AP).

5. The method of claim 1, wherein the wireless device is a mobile device.

6. A wireless device comprising:
   a processor; and
   a non-transitory computer readable storage medium storing programming for execution by the processor, the programming including instructions to:
   transmit a Physical Layer Convergence Protocol (PLCP) Protocol Data Unit (PPDU), wherein a channel indicator in a media access control (MAC) header of the PPDU indicates whether the PPDU is transmitted over a primary channel.

7. The wireless device of claim 6, wherein the channel indicator in the MAC header of the PPDU indicates that the PPDU is transmitted over a primary channel.

8. The wireless device of claim 6, wherein the channel indicator in the MAC header of the PPDU directly indicates that the PPDU is transmitted over an alternate primary channel.

9. A method comprising:
   receiving, by a wireless device, a Physical Layer Convergence Protocol (PLCP) Protocol Data Unit (PPDU); and
   determining whether the PPDU was received over a primary channel based on a channel indicator in a media access control (MAC) header of the PPDU.

10. The method of claim 9, wherein the channel indicator in the MAC header of the PPDU indicates that the PPDU is transmitted over a primary channel.

11. The method of claim 9, wherein the channel indicator in the MAC header of the PPDU directly indicates that the PPDU is transmitted over an alternate primary channel.

12. The method of claim 9, wherein the wireless device is an access point (AP).

13. The method of claim 9, wherein the wireless device is a mobile device.

14. A wireless device comprising:
    a processor; and
    a non-transitory computer readable storage medium storing programming for execution by the processor, the programming including instructions to:
    receive a Physical Layer Convergence Protocol (PLCP) Protocol Data Unit (PPDU); and
    determine whether the PPDU was received over a primary channel based on a channel indicator in a media access control (MAC) header of the PPDU.

15. The wireless device of claim 14, wherein the channel indicator in the MAC header of the PPDU indicates that the PPDU is transmitted over a primary channel.

16. The wireless device of claim 14, wherein the channel indicator in the MAC header of the PPDU directly indicates that the PPDU is transmitted over an alternate primary channel.

17. A method by a network component for carrier aggregation for wireless networks, the method comprising:
    transmitting, by a wireless device, a Physical Layer Convergence Protocol (PLCP) Protocol Data Unit (PPDU), wherein a bandwidth indicator in a media access control (MAC) header of the PPDU indicates an amount of bandwidth occupied by the PPDU.

18. The method of claim 17, wherein the wireless device is an access point (AP).

19. The method of claim 9, wherein the wireless device is a mobile device.

20. The wireless device of claim 14, wherein the wireless device is an access point (AP).

21. The wireless device of claim 14, wherein the wireless device is a mobile device.

* * * * *